(12) United States Patent
McCown et al.

(10) Patent No.: US 9,077,711 B2
(45) Date of Patent: Jul. 7, 2015

(54) SELECTIVE COMPLEX DATA ENTRY FROM ONE TIME PASSWORDS FOR AUTHENTICATION

(71) Applicant: Verizon Patent and Licensing Inc., Basking Ridge, NJ (US)

(72) Inventors: Jonathan McCown, Dillsburg, PA (US); Paul V. Hubner, McKinney, TX (US); Steven T. Archer, Dallas, TX (US); Paul Hubbard, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 14/019,017

(22) Filed: Sep. 5, 2013

(65) Prior Publication Data

US 2015/0067798 A1     Mar. 5, 2015

(51) Int. Cl.
*H04L 9/32* (2006.01)
*H04L 9/00* (2006.01)
*H04L 29/06* (2006.01)

(52) U.S. Cl.
CPC ................................. *H04L 63/0838* (2013.01)

(58) Field of Classification Search
CPC ... H04L 63/08; H04L 63/083; H04L 63/0838; H04L 63/0869; G06F 21/44; G06F 21/445

USPC ............... 380/44; 713/168–170, 183–184; 726/2–6, 16–20

See application file for complete search history.

(56) References Cited

U.S. PATENT DOCUMENTS

| | | | | |
|---|---|---|---|---|
| 7,552,467 | B2 * | 6/2009 | Lindsay | 726/5 |
| 8,340,637 | B2 * | 12/2012 | Drovdahl et al. | 455/411 |
| 8,639,628 | B2 * | 1/2014 | Popp | 705/67 |
| 8,832,807 | B1 * | 9/2014 | Kuo et al. | 726/6 |
| 2010/0246811 | A1 * | 9/2010 | Sadler | 380/28 |

* cited by examiner

*Primary Examiner* — Hosuk Song

(57) ABSTRACT

A one time password (OTP) associated with a client device, and a padding rule, of a plurality of possible padding rules, associated with the client device may be determined. A padded OTP that includes the OTP and additional data may be formed based on the padding rule. The padding rule may be associated with at least one of a position of the OTP within the padded OTP, a characteristic of the additional data, or a characteristic of the padded OTP. The padded OTP may be provided to the client device. A selection of a portion of the padded OTP may be received from the client device, and the client device may be authenticated when the selected portion of the padded OTP corresponds to the OTP. If the selected portion of the padded OTP does not correspond to the OTP, other actions may be performed based on the selected portion.

20 Claims, 9 Drawing Sheets

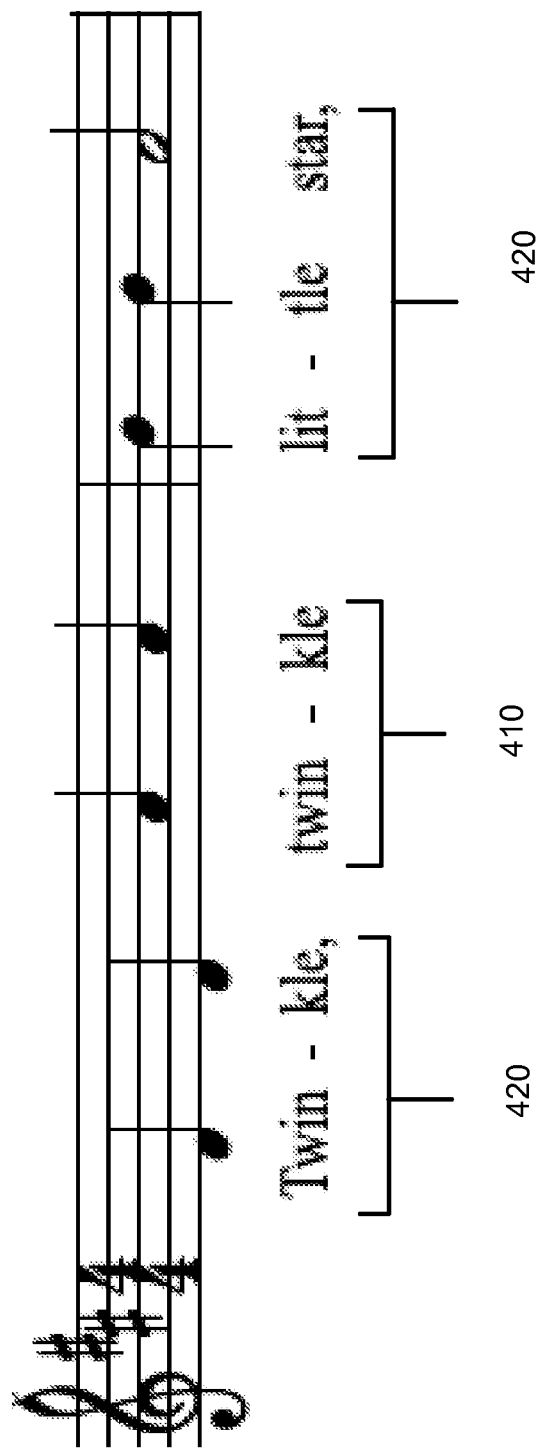

SELECTIVE COMPLEX DATA ENTRY FROM ONE TIME PASSWORDS FOR AUTHENTICATION

BACKGROUND

A one time password (OTP) may be provided to a client device and may be used by the client device to verify an identity of an associated user. For example, the client device may use the OTP to perform various actions, such as accessing restricted information, purchasing goods and services, requesting changes to an account, etc. However, use of the OTP by an unauthorized third party may be difficult to detect. For example, the OTP may be intercepted by the third party during transmission to the client device, or the client device, if lost, may be used by the third party to obtain the OTP.

BRIEF DESCRIPTION OF THE DRAWINGS

FIGS. 1-4 provide exemplary padded one time passwords (OTPs) according to implementations described herein;

DETAILED DESCRIPTION OF PREFERRED EMBODIMENTS

The following detailed description refers to the accompanying drawings. The same reference numbers in different drawings may identify the same or similar elements.

Systems and/or methods described herein may enable a dynamically generated one time password (OTP) to be hidden within a dynamically generated larger data set according to a customizable rule that allows a user to identify the OTP within the larger data set without knowledge of the specific contents of the OTP or the larger data set. The systems and/or methods described herein may further enable implementation of various authentication decisions and related actions based on a portion of the larger data set received during authentication.

Figure 1:
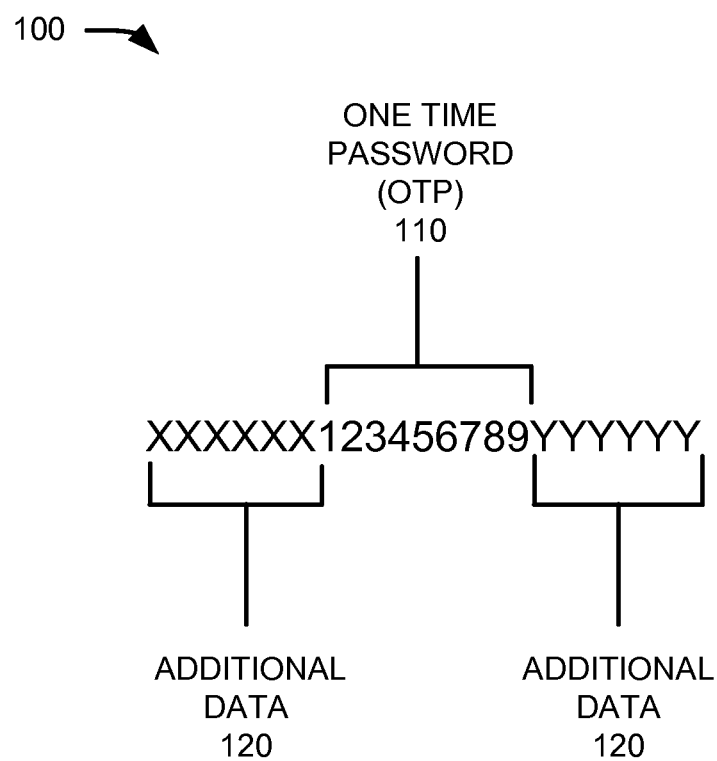

FIG. 1 provides an exemplary padded character string 100 in accordance with an implementation described herein. As illustrated in FIG. 1, padded character string 100 may include OTP 110 (depicted in FIG. 1 as "123456789") and padding data 120 (depicted in FIG. 1 as "XXXXXX" and "YYYYYY"). Padded character string 100 may include a string of alphanumeric and/or other types of characters, such as American Standard Code for Information Interchange (ASCII) or Windows-1252 characters.

The position of OTP 110 within padded character string 100 may be determined based on one or more placement rules received from or shared with the client device prior to providing padded character string 100 to the client device. In this way, a user associated with the client device may identify OTP 110 within padded character string 100 without any knowledge of OTP 110, and a third party in possession of padded character string 100 may not easily identify OTP 110 without the placement rule. The placement rule may specify, for example, a particular position of OTP 110 in padded character string 100 (e.g., OTP 110 is positioned at the end of padded password or that OTP 110 begins at a fifth number of characters of padded character string 100). Alternatively, the placement rule may specify a logical basis for identifying OTP 110 in padded character string 100 (e.g., OTP 110 may be adjacent to one or more particular characters known to a user or near a particular pattern of characters, such as a repeated character). Furthermore, various combination of placement rules may be used, such as using different rules at different times (e.g., OTP 110 may be positioned near the first repeated character at certain times, and positioned after a particular character at other times) or using combinations related to position and logical basis (e.g., OTP 110 may be positioned near the first repeated characters, after a particular sequence of characters, in padded character string 100).

Each of OTP 110 and padding data 120 may include characters generated using various methods. For example, one or more characters of OTP 110 and/or padding data 120 may be randomly generated or may be generated based on an algorithm. In one implementation, one or more characters of OTP 110 and/or padding data 120 may be generated based on various mathematical operations and techniques, such as identification and manipulation of prime numbers, etc. One or more characters of OTP 110 and/or padding data 120 may also be generated in response to a request received from the client device. For example, a portion of OTP 110 and/or padding data 120 may be generated based on information associated with the client device or based on a time or other information associated with the request. In certain implementations, various combinations of techniques may be used to generate OTP 110 and/or padding data 120.

Padded character string 100 may be evaluated to determine whether OTP 110 can be determined based on the applied placement rule. This evaluation may help prevent using particular padding data 120 if the particular padding data 120 would cause confusion when identifying OTP 110. For example, if the applied placement rule indicates that OTP 110 is located adjacent to a particular character, identifying OTP 110 may be difficult if padding data 120 inadvertently includes multiple instances of the particular character.

Padding data 120 may be generated and/or combined with OTP 110 further based on applying one or more data integrity rules to padded character string 100. For example, OTP 110 may be associated with a particular mathematical property, and padded character string 100 (that includes OTP 110 and padding data 120) may be evaluated to determine if padded character string 100 is also associated with the particular mathematical property. For example, if OTP 110 is a prime number, padding data 120 may be selected so that padded character string 100 is also a prime number. Similarly, if OTP 110 is associated with a particular checksum or other modulo or remainder-related value, padding data 120 may be selected so that padded character string 100 is also associated with the particular checksum or other value. This determination may help prevent a third party, in possession of padded character string 100, from identifying OTP 110 by determining portions of padded character string 100 associated with the particular mathematical property.

Although FIG. 1 provides padded character string 100 that includes padding data 120 before and after OTP 110, it should be appreciated that this configuration is provided merely for purposes of example and that padded character string 100 may include various combinations of OTP 110 and padding data 120. For example, OTP 110 may be positioned at the beginning or end of padded password character string 100. Furthermore, the characters included in OTP 110 may not be contiguous within padded character string 100, and a placement rule may disperse characters of OTP 110 within padding data 120 (e.g., portions of OTP 110 may correspond to odd characters in padded character string 100).

Figure 2B:
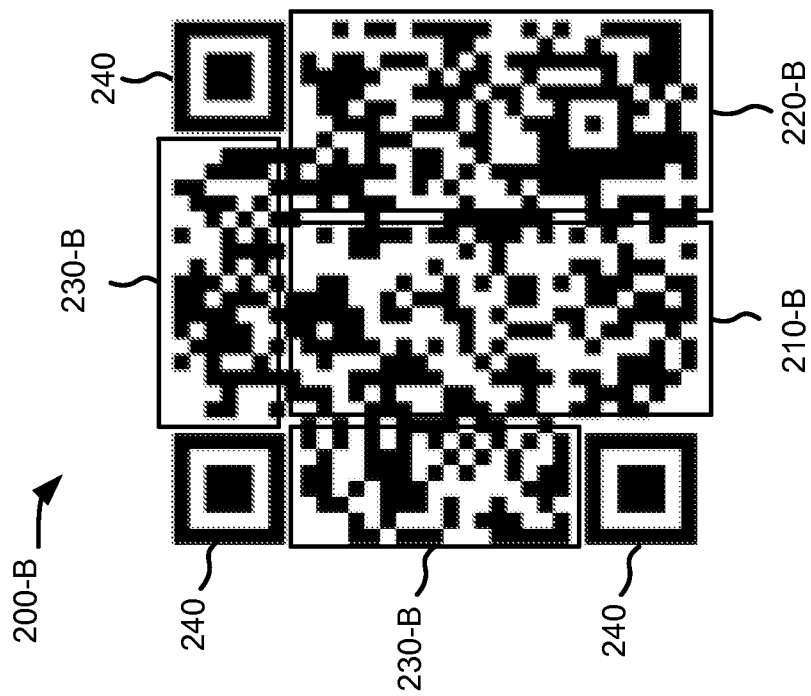
Figure 2A:
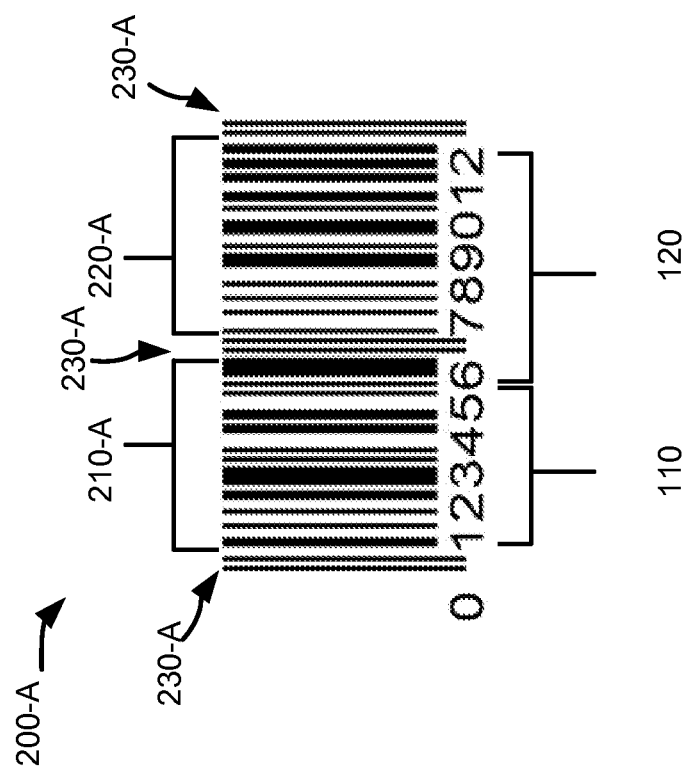

FIGS. 2A and 2B provide exemplary padded bar codes 200-A and 200-B in accordance with implementations described herein. As provided collectively in FIGS. 2A and 2B, padded bar codes 200-A and 200-B may include OTP portions 210-A and 210-B, padding data portions 220-A and 220-B, formatting data 230-A and 230-B, and location indicators 240.

Padded bar code 200-A may correspond to a one-dimensional, or linear, bar code, and padded bar code 200-B may correspond to a two-dimensional bar, or quick response (QR), code. Padded bar codes 200-A and 200-B may graphically represent, for example, characters included in padded character string 100. During authorization, the user may be asked to scan OTP portion 210-A or 210-B or otherwise identify characters corresponding to OTP portion 210-A or 210-B (e.g., convert padded bar codes 200-A and 200-B into a character string and then identifying OTP 110 within the character string).

As illustrated in FIG. 2A, padded bar code 200-A may include a series of parallel lines of varying widths and spacings that represent characters that includes OTP portion 210-A (provided in FIG. 2A as "12345") and padding data portion 220-A (provided in FIG. 2A as "6789012"). OTP portion 210-A may represent characters included in OTP 110, and padding data portion 220-A may represent characters included in padding data 120. Various types of encoding schemes, such as Universal Product Codes (UPCs), may be used to map characters included in OTP 110 and padding data 120 to, respectively, OTP portion 210-A and padding data portion 220-A. As illustrated in FIG. 2A, padded bar code 200-A may also display information identifying OTP 110 and padding data 120 so that a client device may be verified by inputting the OTP 110 or by scanning a corresponding portion of padded bar code 200-A.

As illustrated in FIG. 2B, padded bar code 200-B may include a two-dimensional geometric pattern that includes various rectangles, dots, hexagons, and/or other geometric shapes. The geometric pattern included in padded bar code 200-B may represent characters included in OTP 110 and padding data 120. For example, OTP portion 210-B may represent characters included in OTP 110, and padding data portion 220-B may represent characters included in padding data 120. Various types of encoding schemes, such as the QR codes, may be used to map characters included in OTP 110 and padding data 120 to, respectively, OTP portion 210-B and padding data portion 220-B.

As previously described, OTP portions 210-A and 210-B and padding data portion 220-A and 220-B may graphically correspond, respectively, to characters included in OTP 110 and padding data 120. Thus, in one implementation, OTP portion 210-A and 210-B and padding data portion 220-A and 220-B may be formed by generating OTP 110 and padding data 120, as described above with respect to FIG. 1 and then converting OTP 110 and padding data 120 to a bar code form or QR code form based on one or more positioning rules. Due to the graphical nature of padded bar codes 200-A and 200-B, additional types of positioning rules may be applied for embedding and subsequently locating OTP portions 210-A and 210-B. For example, OTP portion 210-A or 210-B may be positioned in padded bar codes 200-A or 200-B adjacent to a particular graphical feature (e.g., positioning OTP portion 210-A adjacent to the first thick line or positioning OTP portion 210-B adjacent to a particular grouping of shapes).

Because OTP portions 210-A and 210-B and padding data portion 220-A and 220-B may graphically correspond to characters included in OTP 110 and padding data 120, the placement rule and and/or one or more data integrity rules may be applied to the composite character string represented by padded bar codes 200-A and 200-B, as described above with respect to FIG. 1. For example, a UPC code may employ a checksum to the verify integrity of a bar code, and padding data portion 220-A or 220-B may be selected so that padded bar code 200-A or 200-B is associated with a similar check sum vale. Furthermore, formatting data 230-A and 230-B and/or location indicators 240 (in padded bar code 200-B) used in some encoding schemes, such as UPC or QR codes, may be evaluated to verify that padded bar code 200-A or 200-B comply with the encoding schemes.

Due to the graphical nature of padded bar code 200-A or 200-B, additional types of verification of a positioning rule for embedding OTP portion 210-A or 210-B may be performed. For example, a positioning rule indicates that OTP portion 210 is positioned next to a particular combination of graphical elements. Similarly, padded bar code 200-A or 200-B may be evaluated to ensure that the particular combination of graphical elements do not inadvertently occur in other location in padded bar code 200-A or 200-B.

Although FIGS. 2A and 2B provide particular padded bar codes 200-A and 200-B, it should be appreciated that different types of other one-dimension and two-dimension bar coding schemes may be used. Furthermore, FIGS. 2A and 2B provides particular padded bar codes 200-A and 200-B that may include OTP portions 210-A and 210-B adjacent to padding data portions 220-A and 220-B, respectively. However, this configuration is provided merely for purposes of example, and padded bar codes 200-A and 200-B may include, for example, multiple OTP portions 210-A and 210-B.

Figure 3B:
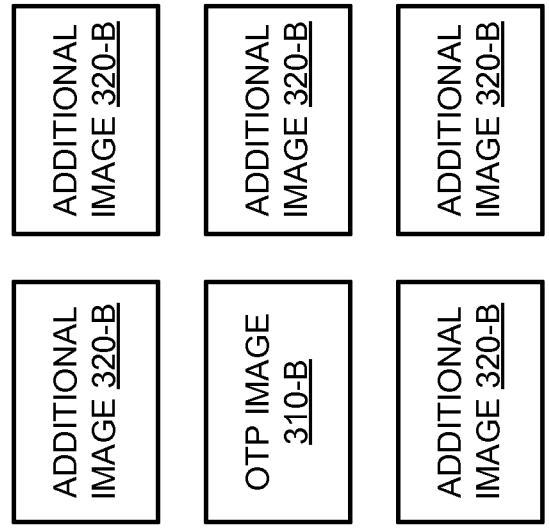
Figure 3A:
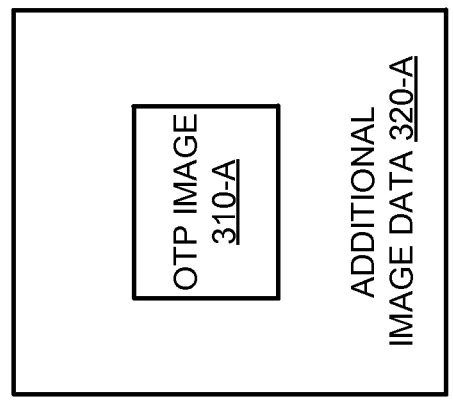

FIGS. 3A and 3B provide exemplary padded images 300-A and 300-B in accordance with implementations described herein. As provided collectively in FIGS. 3A and 3B, padded images 300-A and 300-B may include OTP image 310 and additional image data 320-A and 320-B. During authentication, a user may be asked to identify OTP image 310 and/or describe contents of OTP image 310, and authorization may fail if contents of additional image data 320-A are identified or described.

As illustrated in FIG. 3A, padded image 300-A may include OTP image 310 in a larger image that includes additional image data 320-A. The additional image data 320-A may be determined based on one or more placement rules. A placement rule may relate, for example, a subject associated with additional image data 320-A (e.g., OTP image 310 may relate to a player on a particular sports team, and additional image data 320-A may relate to players on other sports teams). In one implementation, the placement rule may define a position of OTP image 310 within padded image 300-A (e.g., OTP image 310 is located at the top right of padded image 300-A). In another implementation, a placement rule may define a relationship of the subject of OTP image 310 relative to another subject presented in additional image data 320-A. For example, a placement rule may indicate that the OTP image is located adjacent to a particular person or object presented in padded image 300-A (e.g., OTP image 310 corresponds to a person or object left of an image of a flower displayed within padded image 300-A).

Padded image 300-A may correspond to a graphical representation of characters included in padded character string 100. Then, OTP image 310 and other image data 320-A may be determined similarly to OTP 110 and padding data 120, as previously with respect to FIG. 1. Due to the graphical nature of padded image 300-A, different types of placement rules may also be applied. For example, an exemplary placement rule may indicate a position in the displayed characters relative to other characters represented by additional image data 320-A. Another exemplary placement rule may indicate color or other image aspect associated with characters included in OTP image 310 (e.g., characters included in OTP 310 may be depicted in orange).

Padded image 300-A may be dynamically generated based on OTP image 310. Additional image data 320-A may be determined based on the placement rule and one or more image integrity rules. For example, portions of additional image data 320-A adjacent to OTP image 310 may have colors, tone, and/or brightness that correspond to colors, tone, and/or brightness of OTP image 310. This type of visual consistency may help prevent the additional image data 320-A from being visually conspicuous with respect to OTP image 310.

In another implementation, padded image 300-A may be selected from a corpus of images based on a subject of OTP image 310. For example, if OTP image 310 corresponds to the Statue of Liberty, padded image 300-A may present a skyline of New York City. In another example, OTP image 310 may corresponds to an individual, and padded image 300-A may present a group that includes the individual.

As provide in FIG. 3B, padded images 300-B may correspond to a group of separate images that include OTP image 310 and other images associated with additional image data 320-B. A placement rule may indicate that OTP image 310 is positioned at a particular location (e.g., top right) in padded images 300-B.

In another implementation, padded images 300-B may represent a plurality of subjects, and OTP image 310 may be properly identified based on a pre-determined rule. For example, OTP image 310 may correspond to a particular person or object known to the user (e.g., padded images 300-B may represent a group of people, and OTP image 310 may represent one of the user's family members). In one implementation, the subjects depicted in OTP image 310 and additional image data 320-B may be selected from a common category (e.g., animals) and OTP image 310 may present an example from that common category with a particular characteristic (e.g., the largest animal). OTP image 310 may be presented relative to another subject presented in other image data 320-B. For example, OTP image may be located adjacent to a person (e.g., the oldest person) or object (e.g., a red item) depicted in additional image data 320-B.

Although FIGS. 3A and 3B provide exemplary padded images 300-A and 300-B, it should be appreciated that different types or combinations of images may be used. For example, FIG. 3B provides that padded images 300-B includes OTP image 310 and five other images associated with other image data 320-B, but padded images 300-B may include any number and layout of images. For example, padded images 300-B can be provided one at a time in a series, such as in a video slide show. Padded images 300-A or 300-B may be further provided in connection with audio data, such as music. In this implementation, OTP image 310 may be identified by the user, for example, based on a portion of the audio data (e.g., OTP image 310 is associated with particular sound pattern).

FIG. 4 depicts an exemplary padded audio 400 in accordance with an implementation described herein. As illustrated in FIG. 4, padded audio 400 may include OTP audio section 410, and additional audio section 420. During authentication, a user may be asked to identify or reproduce, for example, notes or lyrics associated with OTP audio section 410, and authorization may fail if contents of additional audio section 420 are identified or reproduced.

In exemplary padded audio 400 provide in FIG. 4, OTP audio section 410 corresponds to a second "twinkle" in the song "Twinkle, Twinkle Little Star." OTP audio section 410 may be identified from padded audio 400 based on one or more rules. In the example provide in FIG. 4, OTP audio section 410 may correspond to the first repeated word, the second word, the first occurrence of a particular note, etc.

Padded audio 400 may be selected from a corpus of audio data based on OTP audio section 410. For example, padded audio 400 may be selected based on lyrics, a musical pattern, etc., included in OTP audio section 410. In another implementation, padded audio 400 may be dynamically formed based on OTP audio section 410. For example, additional audio section 420 may be selected based on the tone, volume, pitch, etc. of OTP audio section 410 such that OTP audio section 410 is not conspicuous within padded audio 400.

In another implementation, padded audio 400 may relate to an audio representation of data and may not relate to music. For example, padded audio 400 may correspond to an audio representation of padded character string 100 (e.g., padded character string 100 is vocalized), and OTP audio section 410 may correspond to OTP 110. Padded audio 400 may be dynamically generated by generating padded character string 100, as described with respect to FIG. 1, and converting the padded character string 100 to audio.

Although FIG. 4 provides an exemplary padded audio 400, it should be appreciated that different types and/or combinations of audio and rule-based on authentication may be used. For example, padded audio 400 may include music from multiple songs and OTP audio section 410 may corresponds to one of the songs associated with a particular musical genre and/or audio characteristic.

Figure 5:
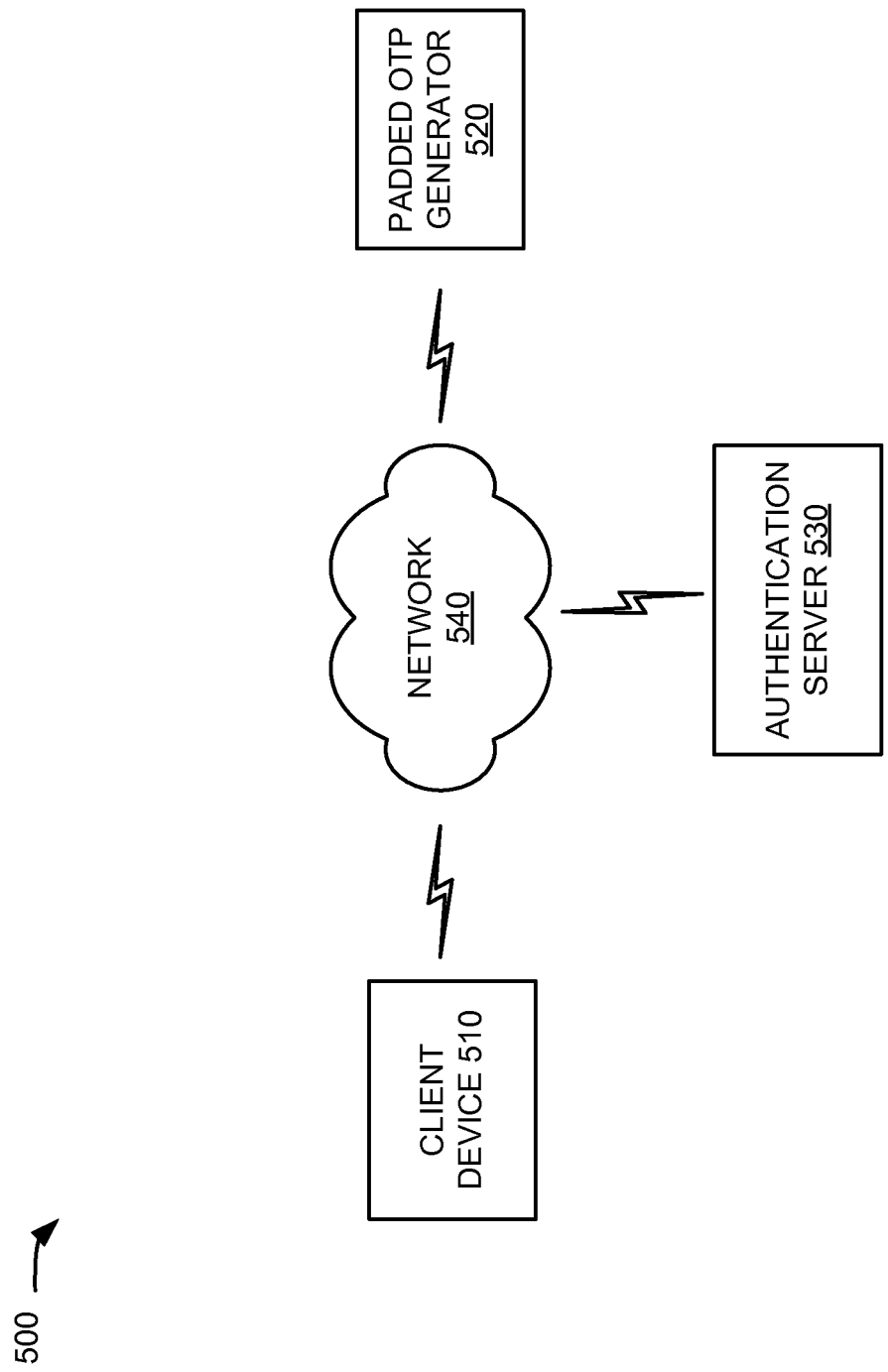
FIG. 5 provides an exemplary system in which a padded OTP, such as those provided in FIGS. 1-4, may be used according to an implementation described herein.

FIG. 5 provides an exemplary system 500 in which systems and/or methods described herein may be implemented. As illustrated in FIG. 5, system 500 may include client device 510, padded OTP generator 520, authentication server 530, and network 540. Techniques described herein may be used to allow padded OTP generator 520 to generate and provide a padded OTP (such as padded character string 100, padded bar code 200-A or 200-B, padded images 300-A or 300-B, and/or padded audio 400) to client device 510 via network 540, and client device 510 may forward a portion of the padded OTP to authentication server 530, via network 540, for authentication.

Client device 510 may include any type of device associated with a user, such as a computer, a mobile device, a set-top box, etc. Client device 510 may present, to the user, one or more rules for identifying an OTP within the padded OTP. In one implementation, the user may designate the rules for identifying an OTP through the client device 510 or through another device associated with the user (e.g., a different client device), and then forward the rules to padded OTP generator 520. Alternatively, client device 510 may receive the rules from OTP generator 520.

Subsequent to providing the rules to the user, client device 510 may communicate with padded OTP generator 520 via network 540 to receive the padded OTP. For example, client device 510 may receive the padded OTP via e-mail, a short messaging service (SMS), a data session, a communications session, etc. Client device 510 may present the padded OTP to the user and receive, from the user, a selection of a portion of the padded OTP. Client device 510 may communicate with authentication server 530 to forward information associated with the selection to authentication server 530. For example, client device 510 may forward the information via e-mail, SMS, a data session, a communications session, etc.

Client device 510 may further receive, such as from the user, data defining a portion of the padded OTP that is associated with a request for assistance or other communication. For example, the user may designate a selection from a particular portion of the padded OTP, as the request for assistance or other communication.

Padded OTP generator 520 may generate or receive an OTP and then generate the padded OTP. For example, padded OTP generator 520 may embed the OTP in the padded OTP such that the OTP may be identified with the padded OTP based on the rules provided to the user. As described with respect to FIGS. 1-4, padded OTP generator 520 may further apply one or more data integrity rules to ensure that the OTP is not conspicuous within the padded OTP. The OTP generator 520 may further provide, for example, information regarding the padded OTP to client device 510 and information regarding the OTP to authentication server 530.

Authentication server 530 may receive information regarding the OTP, such as from padded OTP generator 520, and information from client device 510 regarding the selection of the portion of the padded OTP. Authentication server 530 may authenticate client device 510 when the selected portion of the padded OTP corresponds to the OTP. Authentication server 530 may reject client device 510 from authentication with the selected portion of the padded OTP does not correspond to the OTP. If the selected portion of the padded OTP corresponds to the request for assistance, authentication server 530 may contact an appropriate third party to request assistance to the user. If the selected portion of the padded OTP corresponds to another type of communication, authentication server 530 may perform an appropriate action. For example, if the selected portion of the padded OTP corresponds to a request for technical assistance, authentication server 530 may initiate communications between the client device and a technical advisor. In another implementation, respective portions of the padded OTP may correspond to two or more communications.

Network 540 may include one or more data or communications networks to enable communications between client device 510, padded OTP generator 520, and/or authentication server 530. For example, network 540 may include a network that distributes or makes available services, such as, for example, television services, mobile services, and/or Internet services. Network 540 may be a satellite-based network and/or a terrestrial-based network. In one implementation, network 540 may include an Internet Protocol (IP)-based network.

Although FIG. 5 provides exemplary components of system 500, in other implementations, system 500 may include fewer components, different components, differently arranged components, or additional components than depicted in FIG. 5. For example, padded OTP generator 520 and authentication server 530 may correspond to a common device or a common group of devices, such computing devices or computer devices. Also, in some instances, a component of network 500 may perform one or more functions described as being performed by another component or group of components of network 500 and/or one component may perform functions describes as being performed by two or more devices.

Figure 6:
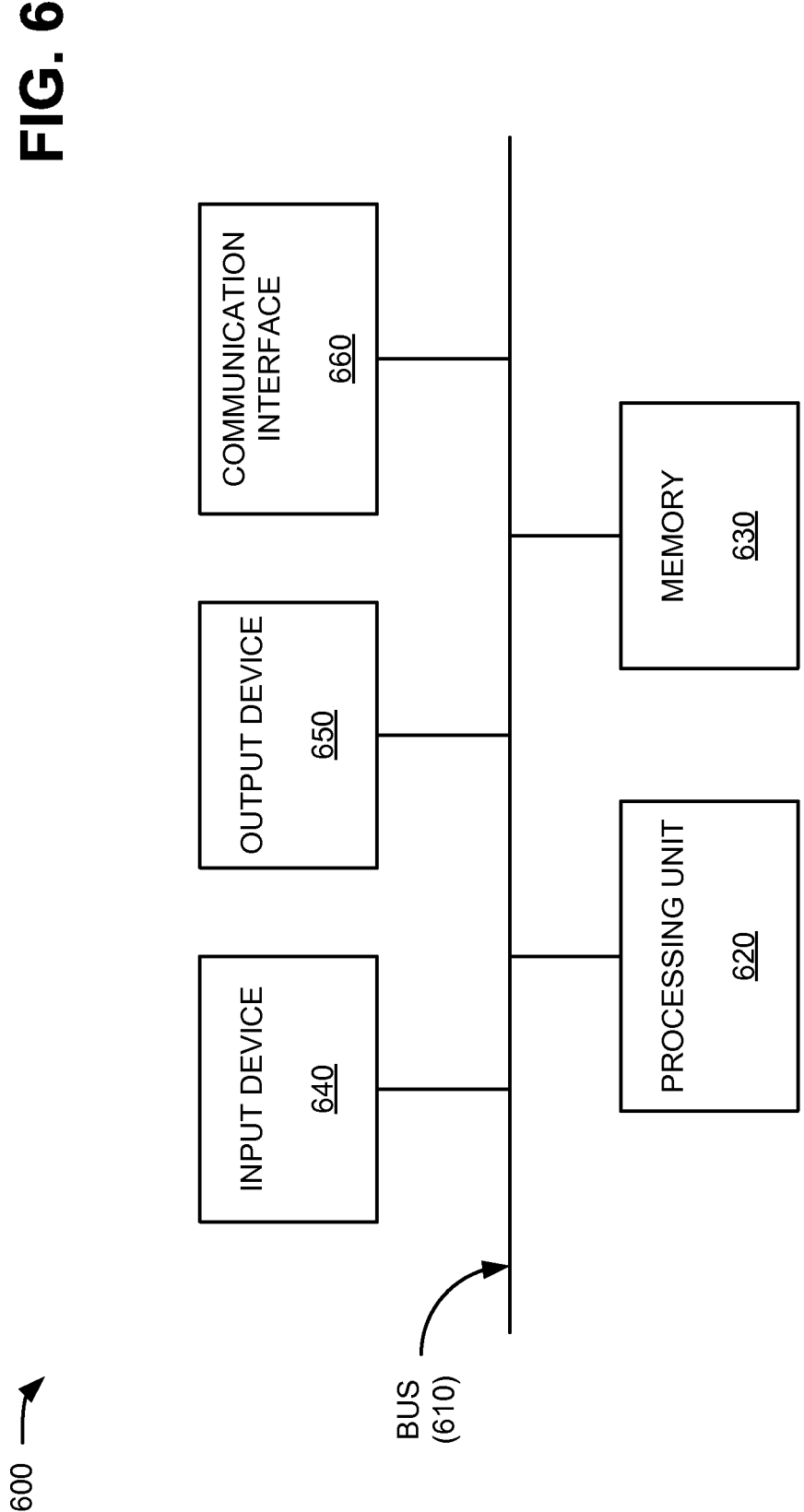
FIG. 6 provides a schematic diagram of exemplary components of a device that may be used within the system of FIG. 5 according to an implementation described herein.

FIG. 6 provides a diagram of exemplary components of a device 600 in accordance with an implementation provided herein. Device 600 may correspond, for example, to client device 510, padded OTP generator 520, and/or authentication server 530. Each of client device 510, padded OTP generator 520, and/or authentication server 530 may include one or more devices 600. As illustrated in FIG. 6, device 600 may include a bus 610, a processing unit 620, a memory 630, an input device 640, an output device 650, and a communication interface 660.

Bus 610 may permit communication among the components of device 600. Processing unit 620 may include one or more processors or microprocessors that interpret and execute instructions. In other implementations, processing unit 620 may be implemented as or include one or more application specific integrated circuits (ASICs), field programmable gate arrays (FPGAs), or the like.

Memory 630 may include a random access memory (RAM) or another type of dynamic storage device that stores information and instructions for execution by processing unit 620, a read only memory (ROM) or another type of static storage device that stores static information and instructions for the processing unit 620, and/or some other type of magnetic or optical recording medium and its corresponding drive for storing information and/or instructions.

Input device 640 may include a device that permits an operator to input information to device 600, such as a keyboard, a keypad, a mouse, a pen, a microphone, one or more biometric mechanisms, and the like. Output device 650 may include a device that outputs information to the operator, such as a display, a speaker, etc.

Communication interface 660 may include a transceiver (e.g., a transmitter and/or receiver) that enables device 600 to communicate with other devices and/or systems. For example, communication interface 660 may include mechanisms for communicating with other devices, such as other devices of network 540 or another device 600.

As described herein, device 600 may perform certain operations in response to processing unit 620 executing software instructions contained in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device via communication interface 660. The software instructions contained in memory 630 may cause processing unit 620 to perform processes described herein. Alternatively, hardwired circuitry may be used in place of or in combination with software instructions to implement processes described herein. Thus, implementations described herein are not limited to any specific combination of hardware circuitry and software.

Although FIG. 6 provides exemplary components of device 600, in other implementations, device 600 may include fewer components, different components, differently-arranged components, or additional components than depicted in FIG. 6. As an example, in some implementations, input device 640 and/or output device 650 may not be implemented by device 600. In these situations, device 600 may be a "headless" device that does not explicitly include an input or an output device. Alternatively, or additionally, one or more components of device 600 may perform one or more other tasks described as being performed by one or more other components of device 600.

Figure 7:
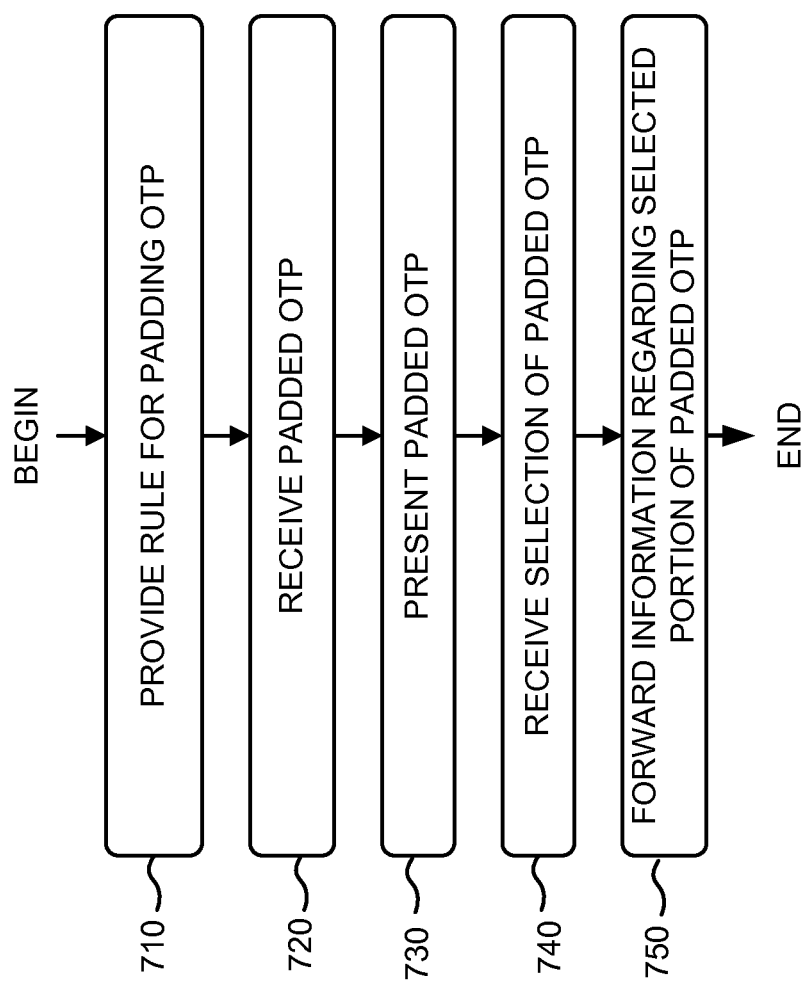
FIG. 7 provides an exemplary flow diagram of a process for using a padded OTP according to an implementation described herein.

FIG. 7 provides a flow diagram of an exemplary process 700 for handling a padded OTP (such as padded character string 100, padded bar code 200-A or 200-B, padded images 300-A or 300-B, and/or padded audio 400) by a client device (such as client device 510) in accordance with an implementation described herein. As illustrated in FIG. 7, client device 510 may provide a rule for interpreting a padded OTP for display to an associated user (block 710). For example, client device 510 may receive information regarding the rule from another device, such as padded OTP generator 520, or client device 510 may provide an interface to receive information regarding the rule from a user. If client device 510 receives the rule from the user, client device 510 may publicize information associated with the rule to another device, such as padded OTP generator 520 and/or authentication server 530.

The padded OTP may be received by client device 510 (block 720). For example, the padded OTP may be received from OTP generator 520 or an intermediary device via network 540. Information regarding the padded OTP may be presented to the user (block 730). For example, a display associated with the client device 510 may present one or more of padded character string 100, padded bar code 200-A or 200-B, or padded images 300-A or 300-B, or an audio output device associated with client device 510 may play padded audio 400 to the user. Typically, information regarding the rule for interpreting the padded OTP and the padded OTP are received in separate communications.

An input related to a selection of a portion of the padded OTP may be detected by client device 510 (block 740). For example, client device 510 may detect a user input selecting the portion of the padded OTP (e.g., input selecting or providing a portion of the padded character sting 100, scanning a portion of padded bar code 200-A or 200-B, detecting a mouse click in a displayed portion of padded images 300-A or 300-B, recording a portion of padded audio 400 spoken or sung by the user, etc.) Client device 510 may detect a user input related to contents or location of the portion of the padded OTP. Client device 510 may forward information regarding the selected portion of the padded OTP (block 750). For example, client device 510 may forward the information to padded OTP generator 520 or authentication server 530 via network 540 for authentication of client device 510.

Although FIG. 7 provides an exemplary process 700 for handling a padded OTP by client device 510, in other implementations, additional, fewer, or different steps may be used than depicted in FIG. 7. For example, in other implementations, client device 510 may convert the padded OTP for presentation to the user, such as converting padded bar code 200-A or 200-B, padded images 300-A or 300-B, and/or padded audio 400 to a corresponding padded character string 100. Furthermore, although process 700 is discussed as being performed by a client device, it should be appreciated that the acts in process 700 may be perform by other devices or a combination of devices. For example, a first client device (e.g., a key fob) may receive the padded OTP, and a second client device may receive, from the user, the selection of the portion of the padded OTP.

Figure 8:
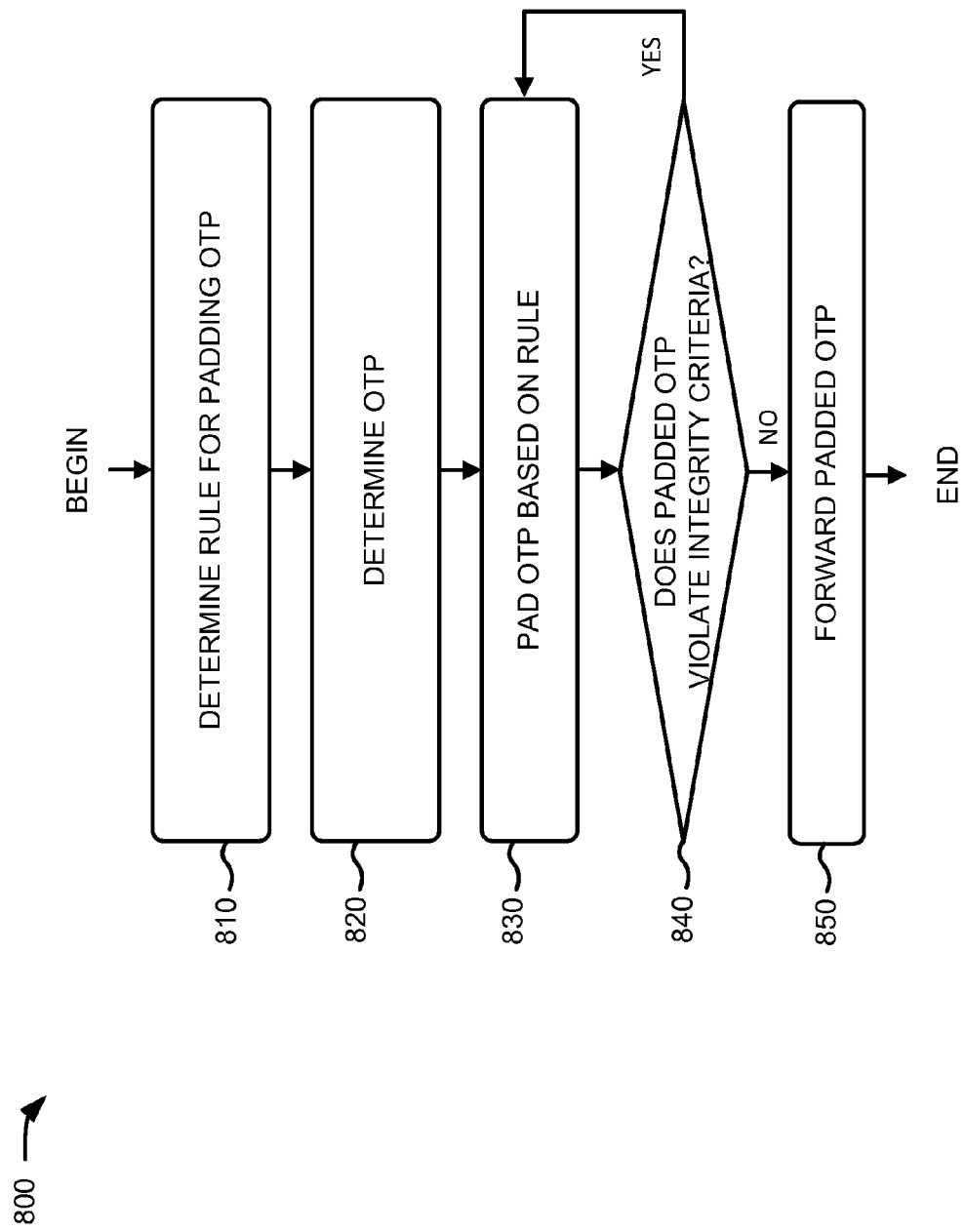
FIG. 8 provides an exemplary flow diagram of a process for forming a padded OTP according to an implementation described herein.

FIG. 8 provides a flow diagram of an exemplary process 800 for providing, by a device such as padded OTP generator 520, a padded OTP (such as padded character string 100, padded bar code 200-A or 200-B, padded images 300-A or 300-B, and/or padded audio 400) to a client device (such as client device 510) in accordance with an implementation described herein. As illustrated in FIG. 8, information about a rule for interpreting a padded OTP may be determined (block 810). For example, a device, such as OTP generator 520, may determine the rule and provide information about the rule to client device 510 or the rule may be received from client device 510. As previously described, the rule may relate, for example, to forming a padded OTP that allows the user to correctly identify an unknown OTP encapsulated in the padded OTP. Information about the rule may also be provided to other devices, such as authentication server 530.

The OTP may be determined (block 820). In one implementation, the OTP may be generated. For example, as described with respect to FIG. 1, the OTP may be randomly determined or may be generated based on a mathematical algorithm. In other implementation, the OTP may be received from another device (i.e., from an OTP generator).

The OTP may be padded with additional data based on the rule to form a padded OTP (block 830). For example, the additional data may be selected or generated based on the rule. As described with respect to FIGS. 1-4, the additional data may be selected, positioned, and/or formatted in the padded OTP so that the OTP is not conspicuous.

After the OTP is padded, the padded OTP may be evaluated to determine whether the padded OTP violates any integrity criteria (block 840). For example, as described with respect to FIGS. 1-4, the OTP may be associated with certain properties (e.g., be associated with a certain checksum value or other mathematical property), and the padded OTP may also comply with these properties. The evaluation of the padded OTP in block 840 may help identify whether the OTP is conspicuous within the padded OTP. OTP may be conspicuous within the padded OTP if, for example, OTP may be visual distinguished from the padding data and/or the OTP may be determined based on pattern recognition or other mathematical techniques. When the padded OTP violates the integrity criteria (block 840—yes), the OTP may be re-padded in block 830. For example, the OTP may be padded using different additional data or by repositioning a portion the additional data or the OTP.

When the padded OTP does not violates the integrity criteria (block 840—no), the padded OTP may be forwarded (block 850). If the rule is also forwarded to client device 510, the padded OTP may be sent to client device 510 via a different communication. The padded OTP may also be sent to another device, such as authentication server 530.

Although FIG. 8 provides an exemplary process 800 for handling a padded OTP by client device 510, in other implementations, additional, fewer, or different steps may be used than depicted in FIG. 8. For example, in other implementations, process 800 may begin with generating the padded OTP and then a portion of the generated padded OTP may be selected as the OTP based on the rule. Also, the padded OTP may be encoded, encrypted, and/or formatted for transmission.

Figure 9:
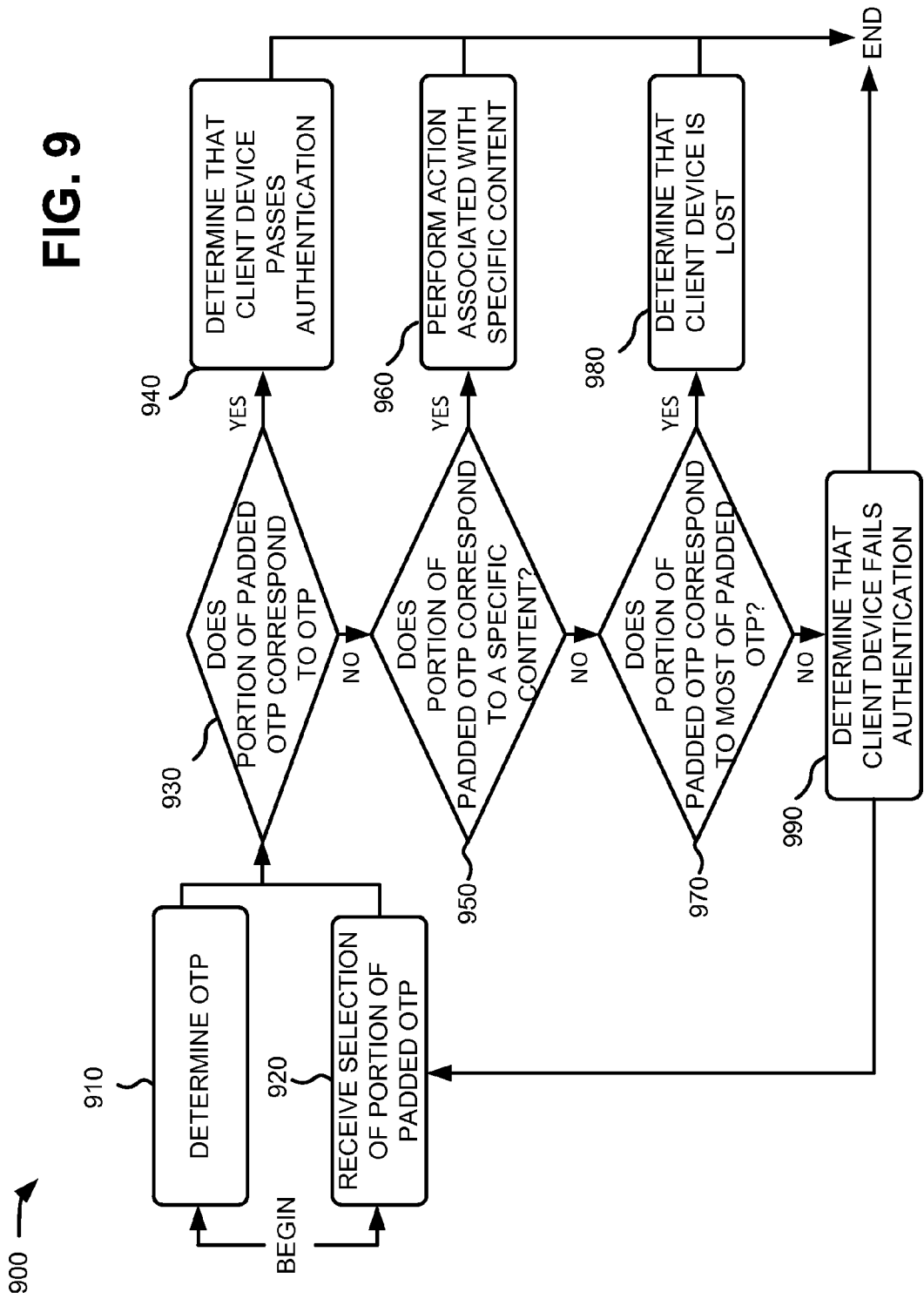
FIG. 9 provides an exemplary flow diagram of a process for processing a selection from a padded OTP according to an implementation described herein.

FIG. 9 provides a flow diagram of an exemplary process 900 for processing a received portion of a padded OTP by a device, such as authentication server 530, in accordance with an implementation described herein. The OTP may be determined (block 910). For example, the OTP may be received from padded OTP generator 520 or another device. Alternatively, authentication server 530 may extract the OTP from the padded OTP based on one or more padding rules, thereby minimizing transmissions of OTP over network 540. Authentication server 530 may further receive an indication of a portion of the padded OTP selected by client device 510 (block 920). For example, authentication server 530 may receive the indication via e-mail, text or other SMS message, a data stream, and a circuit-based communication.

Authentication server 530 may determine whether the selected portion of the padded OTP corresponds to the OTP (block 930), and if selected portion corresponds to the OTP (block 930—yes), client device 510 may pass authentication (block 940).

If the selected portion does not correspond to the OTP (block 930—no), various actions may be performed based on the particular incorrect portions of padded OTP that are selected. For example, authentication server 530 may determine whether the selected portion of the padded OTP corresponds to specific content associated with client device 510, such as an assistance request code or emergency code (block 950). The specific content may be uniquely associated with each device and/or user. For example, an assistance request code may be associated with the first few or the last few characters of the padded OTP. Thus, the specific content may vary for each padded OTP, and a third party may not easily detect input of the specific content by a user of client device 510. In another implementation, the specific content may correspond, for example, to a request for technical assistance or other message or a request for other types of actions. If the selected portion of the padded OTP corresponds to specific content with client device 510 (block 950—yes), an action associated with the specific content may be performed (block 960), such as alerting authorities if the selected portion corresponds to an assistance request code.

If the selected portion of the padded OTP does not correspond to the assistance request code associated with client device 510 (block 950—No), authentication server 530 may attempt to determine whether the selection was made by an unauthorized party (without knowledge of the rule) or whether the intended user made a mistake when making the selection. For example, authentication server 530 may determine whether the selection corresponds to a substantial portion of the padded OTP (block 970), such as selection including more than a threshold portion (e.g., 50%) of the padded OTP. For example, if the selection corresponds to a substantial portion of the padded OTP (block 970—yes), authentication server 530 may determine that client device 510 is lost (block 980). Authentication server 530 may then initiate various actions based on determining that client device is lost, such as deactivating client device 510 and/or modifying actions permitted to be performed by client device 510. If the selection does not correspond to a substantial portion of the padded OTP (block 970—no), authentication server 530 may determine whether the selection corresponds to a substantial portion of the OTP (block 990). For example, authentication server 530 may determine whether the selection includes at least a threshold portion (e.g., at least 75%) of the OTP. If the selection corresponds to the substantial portion of the OTP (block 990—yes), client device 510 may be partially authenticated (block 999). For example, client device 510 may be receive limited access to requested data or resource. If the selection corresponds to the substantial portion of the OTP (block 990—no), client device 510 may be permitted to select of another portion of the padded OTP and/or a selection from another padded OTP (block 920).

Implementations described herein may provide a padded OTP from which an OTP can be extracted based on one or more rules and without knowledge of the OTP. Even if the padded OTP is obtained by the third party, the third party cannot determine the OTP without knowledge of the one or more rules. The padded OTP can be provided various forms or combination of forms, such as a character string, a bar code, an image, and/or an audio clip. Another aspect of the implementations described herein enable selective authentication of a user or implementation of other actions based on different portions of the padded OTP selected by the user.

The foregoing description provides illustration and description, but is not intended to be exhaustive or to limit the invention to the precise form disclosed. Modifications and variations are possible in light of the above teachings or may be acquired from practice of the invention. For example, while series of blocks has been described with respect to process flows provided in FIGS. 7-9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

In the preceding specification, various preferred embodiment have been described with reference to the accompanying drawings. It will, however, be evident that various modifications and changes may be made thereto, and additional embodiments may be implemented, without departing from the broader scope of the invention as set forth in the claims that following. The specification and the drawing are accordingly to be regarded in an illustrative rather than restrictive sense.

What is claimed is:

1. An apparatus comprising:
a memory storing a one time password (OTP); and
a processor configured to:
   receive information received from a client device,
      the information identifying a portion of a padded OTP, and
      the padded OTP including the OTP and additional data,
   compare the portion of the padded OTP and the OTP,
   determine that the client device is authenticated when the portion of the padded OTP corresponds to the OTP,
   determine, when the portion of the padded OTP does not correspond to the OTP, whether the portion of the padded OTP includes at least a threshold amount of the padded OTP, and perform an action when the portion of the padded OTP includes at least the threshold amount of the padded OTP,
wherein the action includes at least one of:
determining that the client device is lost,
determining that the client device is partially authenticated, or
performing additional authentication of the client device.

2. The apparatus of claim 1, wherein the processor is further configured to:
receive the padded OTP and a rule for determining the OTP from the padded OTP, and
determine the OTP from the padded OTP using the rule.

3. The apparatus of claim 1, wherein the padded OTP includes a communication code, and
wherein the processor is further configured to:
determine, when the portion of the padded OTP does not correspond to the OTP, whether the portion of the padded OTP corresponds to the communication code, and
perform an appropriate response based on the when the portion of the padded OTP corresponds to the communication code.

4. The apparatus of claim 1, wherein the processor is further configured to:
receive, from the client device, another selection of another portion of the padded OTP,
determine whether the other portion corresponds to the OTP, and
determine that the client device is authenticated when the other portion corresponds to the OTP.

5. A non-transitory computer readable medium for storing instructions, the instructions comprising:
one or more instructions that, when executed by a processor associated with a computing device, cause the processor to:
provide for display, at a first time, information associated with a rule for extracting a password from a padded password that includes the password and additional data;
receive, at a second time, the padded password;
provide for display, information associated with the padded password;
receive, from a user associated with the computing device, a selection associated with a portion of the padded password; and
forward, to an authentication device, data regarding the selection,
wherein the authentication device determines that the computing device is authenticated when the portion of the padded password corresponds to the password.

6. The non-transitory computer readable medium of claim 5, wherein the instructions further comprise:
one or more instructions to:
receive an input related to rule, and
determine the rule based on the input.

7. The non-transitory computer readable medium of claim 5, wherein the padded password corresponds to a character string, and
wherein the one or more instructions to receive the selection further include:
one or more instructions to receive, as the selection, an input associated identifying one or more characters included in the character string.

8. The non-transitory computer readable medium of claim 5, wherein the padded password corresponds to an image, and
wherein the one or more instructions to receive the selection further include:
one or more instructions to receive, as the selection, an input associated identifying a section of the image.

9. The non-transitory computer readable medium of claim 8, wherein the image corresponds to a geometric pattern associated with a character string, and
wherein the instructions further comprise:
one or more instructions to identify a portion of the character string associated with selection.

10. The non-transitory computer readable medium of claim 5, wherein
the padded password is associated with audio data,
the password is associated with a first portion of the audio data, and
the additional data is associated with a second portion of the audio data that differs from the first portion.

11. A method comprising:
providing for display, by processor associated with a computing device and at a first time, information associated with a rule for extracting a password from a padded password that includes the password and additional data;
receiving, by the processor and at a second time, the padded password;
providing for display, by the processor, information associated with the padded password;
receiving, by the processor and from a user associated with the computing device, a selection associated with a portion of the padded password; and
forwarding, by the processor and to an authentication device, data regarding the selection, wherein the authentication device determines that the computing device is authenticated when the portion of the padded password corresponds to the password.

12. The method of claim 11, further comprising:
receiving information associated with the rule in a first communication,
receiving the padded password in a second communication that differs from the first communication.

13. The method of claim 11, wherein:
the password is associated with a first string of characters, and
the padded password is associated with a second string of characters that includes the first string of characters and one or more additional characters.

14. The method of claim 11, wherein:
the padded password is associated with a bar code,
the password is associated with a first portion of the bar code, and
the additional data is associated with a second portion of the bar code that differs from the first portion.

15. The method of claim 14, wherein the password is associated with a character string and the first portion of the bar code corresponds to the character string, and wherein the additional data includes one or more additional characters and the second portion of the bar code corresponds to the one or more additional characters.

16. The method of claim 11, wherein:
the padded password is associated with an image,
the password is associated with a first portion of the image, and
the additional data is associated with a second portion of the image that differs from the first portion.

17. The method of claim 16, wherein the rule identifies a subject associated with the password, the first portion of the image includes a representation of the subject, and the second portion of the image includes a representations of at of least one other subject.

18. The method of claim 11, wherein:
the padded password is associated with audio data,
the password is associated with a first portion of the audio data, and
the additional data is associated with a second portion of the audio data that differs from the first portion.

19. The method of claim 11, wherein the password is associated with a characteristic, and wherein the additional data causes the padded password to be associated with the characteristic.

20. The method of claim 19, wherein the characteristic includes a particular checksum value.

* * * * *